United States Patent Office 3,793,339
Patented Feb. 19, 1974

3,793,339
1-HYDROCARBON-SUBSTITUTED 2 - HALO-4,5-DI-
CYANOIMIDAZOLES AND THEIR PREPARATION
Owen Wright Webster, Wilmington, Del., assignor to E. I.
du Pont de Nemours and Company, Wilmington, Del.
No Drawing. Filed Apr. 7, 1972, Ser. No. 242,199
Int. Cl. C07d 49/36
U.S. Cl. 260—309
8 Claims

ABSTRACT OF THE DISCLOSURE

Pyrolysis of 2-diazo-4,5-dicyano-2H-imidazole in the presence of certain halohydrocarbons yields 1-hydrocarbon substituted-2-halo-4,5-dicyanoimidazoles.

Pyrolysis of the same starting material in the presence of hydrocarbons, certain other halohydrocarbons, or certain Group I metal salts, yields 2-substituted-4,5-dicyanoimidazoles.

BACKGROUND OF THE INVENTION

Field of the invention

This invention relates to 1-hydrocarbon-substituted 2-halo-4,5-dicyanoimidazoles, to the process of making them by pyrolysis of 2-diazo-4,5-dicyano-2H-imidazole in the presence of certain halohydrocarbons, and to the process of preparing other 2-stubstituted 4,5-dicyanoimidazoles by pyrolysis of 2-diazo-4,5-dicyano-2H-imidazole in the presence of hydrocarbons, certain halohydrocarbons, or certain Group I metal salts.

Prior art 2-diazo-4,5-dicyano-2H-imidazole is described in my coassigned patent application Ser. No. 146,754, filed Aug. 13, 1971. 2-substituted 4,5-dicyanoimidazoles in which the substituents are monovalent hydrocarbon radicals are described by Woodward in U. S. Pat. 2,534,331, the process of making them being based on the reaction of hydrogen cyanide tetramer with ortho esters of monocarboxylic acids. Reaction of diaminomaleonitrile (tetrapolymer of hydrogen cyanide) and benzaldehyde is disclosed to give 2-phenyl-4,5-dicyanoimidazole by Hinkel & Watkins, J. Chem. Soc. 1937, 1432 and 1939, 492. No prior art appears to be known on 1-hydrocarbon-substituted 2-halo-4,5-dicyanoimidazoles.

SUMMARY OF THE INVENTION

The 1-hydrocarbon-substituted 2-halo-4,5-dicyanoimidazoles of the invention have the formula

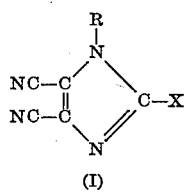

(I)

wherein R is alkyl, alkayl, aralkyl, fluoro (oxaalkyl), haloalkyl or aryl (haloalkyl) each of up to 8 carbon atoms or is phenyl or naphthyl; and X is flourine, chlorine, bromine or iodine; with the proviso that when X is iodine, R is only alkyl, aralkyl, fluoro (oxaalkyl) or haloalkyl, "halo" being F, Cl or Br.

The process of the invention involves pyrolysis of 2-diazo-4,5-dicyano-2H-imidazole (IV below) in the presence of one of various types of compounds including those having the formula RX, where R and X have the foregoing values, R¹H or MA, where R¹ has up to 12 carbon atoms and is cycloalkyl, aryl, haloaryl (halo being F, Cl or Br), (haloalkyl)aryl [halo being F, Cl or Br] or fluoro(oxaalkyl); M is a tetra(lower alkyl) ammonium group or a Group I metal; and A is chlorine, bromine, iodine, cyano, nitro or azido.

When RX is the coreactant in the process, 1-hydrocarbon-substituted 2-halo-4,5-imidazoles of Formula I are produced, and when R¹H or MA is the coreactant other 4,5-imidazoles having the following formulas are produced:

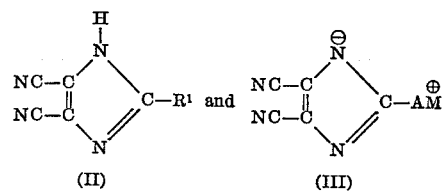

In Formulas II and III, the values of R¹, A and M correspond to those given above.

The reactions underlying the process can be illustrated as follows:

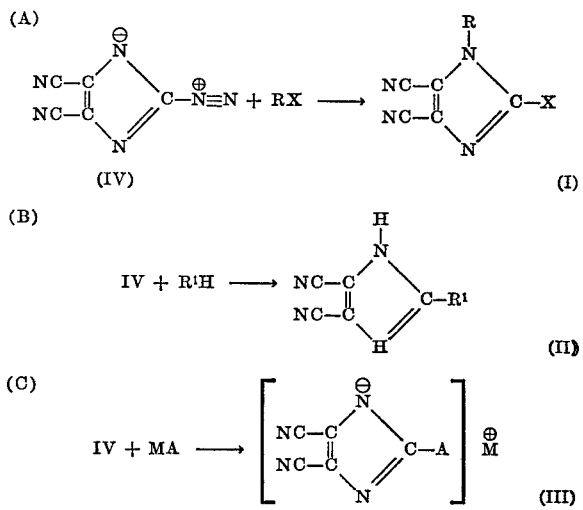

When RX in reaction A is chloro- or bromobenzene and the reaction time is short, a halonium compound corresponding to Formula III can be detected in the reaction mixture. In the case of bromobenzene the halonium compound, 2 - (phenylbromonium)-4,5-dicyano-2H-imidazone, has been found to rearrange on heating to give the Formula I product, 1 - phenyl-2-bromo-4,5-dicyanoimidazole. Accordingly, it is believed reaction A may proceed by a mechanism in which a generally unapparent halonium intermediate is formed.

In the process of the invention the 2-diazo-4,5-dicyano-2H-imidazole must be at least partly soluble, i.e., in the liquid phase, at the temperature of the reaction. An organic or inorganic coreactant must be entirely in the liquid phase either naturally or by solution in a separate inert medium, and such liquid phase must be the medium in which the diazo compound is at least partly dissolved. An organic coreactant can itself be the reaction medium, and inorganic coreactants can be dissolved in water or in a mixture of water and one or more water-miscible organic solvents. Suitable water-miscible organic solvents include acetonitrile, dimethylformamide, dimethylacetamide and dimethyl sulfone.

The reaction can be carried out in the temperature range of about 0° to about 140° C. For organic coreactants, a temperature in the range of about 50° to about 140° C. is suitable, the range of 80° to 100° C. being preferred. For inorganic coreactants, a temperature in the range of about 0° to about 100° C. is suitable, the range of 25–50° C. being preferred.

The process can be carried out over a time schedule of from about one to about 24 hours, the appropriate specific time being generally dependent upon the temperature of reaction. The reaction time is generally shorter at higher temperatures since the rate of reaction increases as the temperature increases.

The process can be carried out at any pressure which provides liquid phase conditions for the reactants, the pressure usually and preferably being atmospheric pressure. However, commensurate with liquid phase conditions, any pressure below or above atmospheric pressure may be used if desired, a practical range being 0.01 to 5000 atmospheres.

Generally, the coreactants in the process include saturated cycloaliphatic hydrocarbons, alkyl fluorides, alkyl chlorides, alkyl bromides, alkyl iodides, polyhaloalkanes, aromatic hydrocarbons, aromatic halides, and Group I metal halides, cyanides, nitrites and azides.

Specific operable coreactants include cyclopentane, cyclohexane, methylcyclohexane, cycloheptane, cyclooctane, cyclononane, cyclodecane, cyclododecane, trichlorofluoromethane, dichlorodifluoromethane, 1,1,2 - trichlorotrifluoroethane, chloromethane, dichloromethane, chloroform, carbontetrachloride, chloroethane, 1,2 - dichloroethane, chloropropane, chlorobutane, chloropentane, bromomethane, dibromomethane, bromoform, bromoethane, bromopropane, iodomethane, diiodomethane, iodoform, iodoethane, fluorobenzene, chlorobenzene, o-dichlorobenzene, m-dichlorobenzene, p-dichlorobenzene, bromobenzene, 1 - chloronaphthalene, 2 - chloronaphthalene, benzyl chloride, benzyl bromide, benzene, toluene, o-xylene, m-xylene, p-xylene, p-diisopropylbenzene, naphthalene, 1-methylnaphthalene, 2-methylnaphthalene, sodium nitrile, potassium nitrite, sodium azide, potassium azide, cuprous chloride, cuprous bromide, sodium iodide, potassium iodide, and cuprous cyanide.

The starting material, 2 - diazo-4,5-dicyano-2H-imidazole, is prepared according to the disclosure in my copending application Ser. No. 146,754, part of which is reproduced below:

DISCLOSURE OF THE INVENTION

The 2-substituted-4,5-dicyanoimidazoles of this invention are (A) the 2-amino-4,5-dicyanoimidazoles of Formula I,

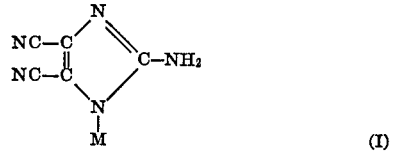

in which M is hydrogen or one equivalent of a metal ion, and (B) 2-diazo-4,5-dicyano-2H-imidazole which may be expressed as the resonance hybrid.

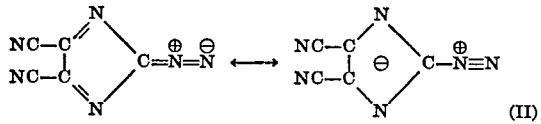

Compounds of Formula I are useful chemical buffers, particularly in water/alcohol systems and 2-diazo-4,5-dicyano-2H-imidazole is a new explosive.

2-amino-4,5-dicyanoimidazole is prepared by the reaction of diaminomaleonitrile with cyanogen chloride. It may be converted to its 2-diazo derivatives by the reaction of nitrous acid. These reactions may be illustrated as follows:

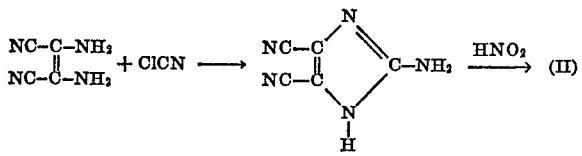

Compounds of Formula I in which M is one equivalent of a metal ion are prepared from 2-amino-4,5-dicyanoimidazole by metathesis.

The reaction of diaminomaleonitrile with cyanogen chloride may be carried out neat. The molecular proportions of the reactants employed may be varied widely, e.g., from 100:1 to 1:100 since any mixture of the two reactants will produce at least some 2-amino-4,5-dicyanoimidazole. However, it is more practical to operate in the range from equimolar proportions up to a 10-molar excess of cyanogen chloride, since excess diaminomaleonitrile is difficult to separate from the product. Equimolar proportions are particularly preferred.

As shown in Example 4, the reaction requires no catalyst. However, to avoid an induction period, it is usually preferred to employ a small amount of a protonic or Lewis acid catalyst to start the reaction. Hydrogen chloride is formed during the reaction and serves to further catalyze it once it is started. Suitable catalysts include $BF_3$, $AlCl_3$, HBr, HCl, $BCl_3$, $H_2SO_4$, and the like.

The use of a liquid reaction medium is not essential. However, it is convenient to employ as a medium any aprotic solvent in which diaminomaleonitrile is at least somewhat soluble and which does not react with cyanogen chloride. Suitable reaction media include acetonitrile, tetrahydrofuran, dioxane, ethyl acetate, ethylene glycol dimethyl ether, and the like.

Time for the reaction may vary from a few minutes (e.g., 5) up to 24 hours or more, depending somewhat on the temperature and the catalyst employed. Temperatures in the range from —30° C. to 100° C. are operable and room temperature is preferred for convenience.

Pressure is not a critical variable in the process and pressures from 0.01 to 100 atmospheres may be employed. Pressures from 1–10 atmospheres are preferred.

2-amino - 4,5 - dicyanoimidazole may be isolated from the reaction mixture by evaporation of solvent (if any) and washing the solid product with water or with aqueous sodium acetate. It may be purified by dissolving in dilute aqueous sodium bicarbonate, treating with activated carbon, and acidification with hydrochloric acid.

In the compounds of Formula I, M may be hydrogen or one equivalent of any metal ion. By metal is meant an element of atomic number 3–4, 11–13, 19–32, 37–51, 55–84, 87–103, and above. Alkali metals such as Li, Na, K, Rb, and Cs are preferred. The compound of Formula I in which M is hydrogen may be isolated in the form of its hydrochloride salt.

SPECIFIC EMBODIMENTS OF THE INVENTION

The following examples are provided to illustrate this invention. In these examples parts and percentages are by weight unless otherwise indicated.

EXAMPLE 1

2-amino-4,5-dicyanoimidazole

To a mixture of 10 g. of diaminomaleonitrile, 20 ml. of cyanogen chloride and 50 ml. of acetonitrile was added 20 ml. of $BF_3$ etherate at 0° to 10° C. A solution formed after 1.5 hours. The excess cyanogen chloride and part of the acetonitrile were removed under reduced pressure, and the solid hydrochloride of 2-amino-4,5-dicyanoimidazole (2.5 g.) was collected on a filter; IR: 3100, 2200, 1640, 1580, 1100, 835, and 725 cm.$^{-1}$. On treatment with water, the hydrochloride release the parent 2-amino-4,5-dicyanoimidazole (0.78 g.); IR: 3500, 3450, 2750, 2650, 2230, 1650, 1500, 1450, 1300, 1275, 1100, 1040, 800, and 730 cm.$^{-1}$.

EXAMPLE 2

2-diazo-4,5-dicyano-2H-imidazole

A small amount of the 2-amino-4,5-dicyanoimidazole from Example 1 was treated with aqueous HCl then $KNO_2$. A precipitate of 2-diazo-4,5-dicyano-2H-imidazole formed; IR: 2230, 1420, 1150, and 735 cm.$^{-1}$. This substance exploded at 146° C.

SPECIFIC EMBODIMENTS OF THE INVENTION

The following examples illustrate the invention and describe typical products obtained. Temperatures are given in degrees centigrade and the reactions are conducted at atmospheric pressure. Reduced pressures, where indicated, are given in terms of millimeters of mercury. All parts and percentages are by weight unless otherwise stated.

EXAMPLE 1

1-(2-chloroethyl)-2-chloro-4,5-dicyanoimidazole
(Formula I, R=—CH$_2$CH$_2$Cl, X=Cl)

A suspension of 2.80 g. of 2-diazo-4,5-dicyano-2H-imidazole in 100 ml. of 1,2-dichloroethane was heated under reflux at 84° C. for 3 hours. Nitrogen gas (500 ml., 20 mmoles) evolved. On removal of the excess 1,2-dichloroethane under reduced pressure, there remained 3.5 g. (80%) of 1-(2-chloroethyl)-2-chloro-4,5-dicyanoimidazole. An analytical sample was recrystallized from carbon tetrachloride, and had M.P. 90–90.5° C.

Analysis.—Calcd. for C$_7$H$_4$Cl$_2$N$_4$ (percent): C, 39.0; H, 1.88; N, 26.0. Found (percent): C, 39.1; H, 1.90; N, 26.0.

NMR

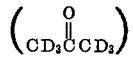

A$_2$B$_2$ pattern δ 4.66, 4.00.

IR (KBr): 3.35, 4.42, 6.25, 6.82, 6.91, 7.15, 7.60, 8.04, 8.45, 9.38, 10.50, 10.92, 14.45, 14.62, 14.81μ.

NaI Test: No positive halogen present.

EXAMPLE 2

1-dibromomethyl-2-bromo-4,5-dicyanoimidazole
(Formula I, R=—CHBr$_2$, X=Br)

A suspension of 28 g. of 2-diazo-4,5-dicyano-2H-imidazole in 200 ml. of bromoform was heated at 80–90° C. for 4 hours. Nitrogen (450 ml.) evolved. The reaction solution was filtered and concentrated to dryness, and the residue chromatographed on silica gel. The first cut (CCl$_4$) yielded 2.07 g. of 1-dibromomethyl-2-bromo-4,5-dicyanoimidazole. An analytical sample was recrystallized from n-butyl chloride, M.P. 134–135° C.

Analysis.—Calcd. for C$_6$HBr$_3$N$_4$ (percent): C, 19.5; H, 0.3; N, 15.2. Found (percent): C, 19.7; H, 0.3; N, 15.0.

IR (KBr): 3.3, 4.45, 6.46, 6.95, 7.53, 7.68, 8.03, 8.34, 8.60, 9.55, 12.36, 13.66, 14.05, 14.45, and 15.25μ.

EXAMPLE 3

2-bromo-1-bromomethyl-4,5-dicyanoimidazole
(Formula I, R=—CH$_2$Br, X=Br)

A suspension of 2.8 g. of 2-diazo-4,5-dicyano-2H-iimdazole in 100 ml. of dibromomethane was heated under reflux for 4 hours. Nitrogen (450 ml.) evolved. The reaction mixture was filtered, and the filtrate concentrated to dryness under reduced pressure. The residue was chromatographed on silica gel. 2-bromo-2-bromomethyl-4,5-dicyanoimidazole (2.08 g.) was obtained from the first cut (CCl$_4$). An analytical sample was recrystallized from cyclohexane, M.P. 71–72° C.

Analysis.—Calcd. for C$_6$H$_2$Br$_2$N$_4$ (percent): C, 24.9; H, 0.70; N, 19.3. Found (percent): C, 25.2; H, 0.60; N, 19.1.

IR (KBr): 3.25, 3.33, 4.45, 6.45, 6.78, 6.98, 7.25, 7.68, 7.95, 8.20, 8.54, 9.45, 11.0, 12.8, 14.7μ.

EXAMPLE 4

2-chloro-1-(1,2-difluoro-1,2,2-trichloroethyl)-4,5-dicyanoimidazole (Formula I, R=—CFClCFCl$_2$, X=Cl)

A mixture of 2.8 g. of 2-diazo-4,5-dicyano-2H-imidazole and 48 g. of 1,2-difluoro-1,1,2,2-tetrachloroethane was heated for 18 hours at 80–83° C. Nitrogen (500 ml.) evolved. The mixture was concentrated to dryness, and the residue (2.51 g.) was sublimed at 75° C. (0.1 mm.) to give 1.84 g. of 2-chloro-1-(1,2-difluoro-1,2,2-trichloroethyl)-4,5-dicyanoimidazole, M.P. 79–82° C.

Analysis.—Calcd. for C$_7$N$_4$Cl$_4$F$_2$ (percent): C, 26.3; N, 17.5; F, 11.9. Found (percent): C, 26.7; N, 17.4; F, 8.2.

IR (KBr): 4.44, 6.25, 6.86, 7.31, 7.70, 8.20, 8.97, 9.32, 9.65, 9.75, 11.65, 12.71, 13.6μ.

EXAMPLE 5

2-iodo-1-ethyl-4,5-dicyanoimidazole (Formula 1, R=—C$_2$H$_5$, X=I)

A suspension of 2.8 g. of 2-diazo-4,5-dicyano-2H-imidazole in 100 ml. of ethyl iodide was heated at 73° C. for 5 hours. Nitrogen (500 ml.) evolved. The reaction mixture was filtered, and the filtrate was concentrated to dryness to give 3.0 g. of 2-iodo-1-ethyl-4,5-dicyanoimidazole. An analytical sample was recrystallized from cyclohexane, M.P. 131.5° C.

Analysis.—Calcd. for C$_7$H$_5$N$_4$I (percent): C, 30.9; H, 1.85; N, 20.6. Found (percent): C, 31.1; H, 1.80; N, 20.3.

IR (Nujol): 4.45, 6.45, 6.8, 7.05, 7.25, 7.4, 7.65, 7.95, 8.42, 9.22, 9.45, 10.45, 12.4, 13.47, 14.32, 14.85μ.

UV: 262 nm. (ε 10,150).

EXAMPLE 6

1-phenyl-2-fluoro-4,5-dicyanoimidazole (Formula I, R=—C$_6$H$_5$, X=F) and 2-(fluorophenyl)-4,5-dicyanoimidazole (Formula II, R$^1$=—C$_6$H$_4$F)

2-diazo-4,5-dicyano-2H-imidazole (5.0 g.) was added to 100 ml. of fluorobenzene in a reactor fitted with a magnetic stirrer and a reflux condenser. The mixture was heated to reflux with stirring overnight, and gas was evolved. The solution was cooled and filtered to separate 3.72 g. (53%) of 2-fluorophenyl)-4,5-dicyanoimidazole. This product was identified by IR and NMR, and by comparison to authentic samples of 2-(o-, m-, p-fluorophenyl)-4,5-dicyanoimidazoles was shown to be 62% ortho, 7.5% meta and 34% para isomers (absolute yield of 33% ortho, 4% meta and 18% para). The filtrate was distilled to yield 2.37 g. of a residue that was recrystallized from hexane to yield 1.15 g. of crystalline white solid, M.P. 93–94° C., that was identified by IR, NMR and analysis as 1-phenyl-2-fluoro-4,5-dicyanoimidazole, yield 15%.

Analysis.—Calcd. for C$_{11}$H$_5$N$_4$F (percent): C, 62.3; H, 2.38; N, 26.4; F, 8.95. Found (percent): C, 62.2; H, 2.59; N, 26.4; F, 8.70.

EXAMPLE 7

1-phenyl-2-chloro-4,5-dicyanoimidazole (Formula I, R=—C$_6$H$_5$, X=Cl) and 2-(chlorophenyl)-4,5-dicyanoimidazole (Formula II, R$^1$=—C$_6$H$_4$Cl)

2-diazo-4,5-dicyano-2H-imidazole (2.9 g.) was added to 100 ml. of chlorobenzene and heated at 127° C. for 16 hours. The reaction mixture then was cooled and 3.39 g. of insoluble material was separated by filtration. This material was shown by IR comparison to be a mixture of 2-(o-, m-, p-chlorophenyl)-4,5-dicyanoimidazoles. The chlorobenzene filtrate was diluted with pentane and 1.7 g. of a gum separated. The gum-free filtrate was distilled to give 2.3 g. of residue that was recrystallized from benzene-hexane to give 2.11 g. (46%) of white crystals, M.P. 108–110° C., identified as 1-phenyl-2-chloro-4,5-dicyanoimidazole by IR, NMR and elemental analyses.

Analysis.—Calcd. for C$_{11}$H$_5$N$_4$Cl (percent): C, 57.8; H, 2.20; N, 24.5; Cl, 15.5. Found (percent): C, 58.0; H, 2.38; N, 24.6; Cl, 15.4.

When the above reaction was run at a shorter heating time (one hour), the reaction mixture contained the halonium product 2 - (phenylchloronium) - 4,5 - dicyano-2H-imidazole.

EXAMPLE 8

1-phenyl - 2 - bromo - 4,5 - dicyanoimidazole (Formula I, R=—$C_6H_5$, X=Br) and 2-(bromophenyl)-4,5-dicyanoimidazole (Formula II, $R^1$=—$C_6H_4Br$)

2-diazo-4,5-dicyano-2H-imidazole (5.5 g.) was added to 70 ml. of bromobenzene and heated to 80° C. After 6 hours, approximately the theoretical yield (930 ml.) of nitrogen gas had been evolved. The solution was refluxed overnight and then filtered hot to separate 2.25 g. of insoluble material. The filtrate was distilled to yield 8.2 g. of gum from which, by extraction with benzene followed by crystallization from hexane, was obtained 1.1 g. of a white solid, M.P. 122–124° C., characterized by IR, NMR and elemental analyses as 1-phenyl-2-bromo-4,5-dicyanoimidazole.

*Analysis.*—Calcd. for $C_{11}H_5N_4Br$ (percent): C, 48.4; H, 1.85; N, 20.5; Br, 29.3. Found (percent): C, 48.5; H, 2.03; N, 20.5; Br, 28.6.

The insoluble product was characterized by IR as 2-(bromophenyl)-4,5-dicyanoimidazole.

When the above reaction was run at a shorter heating time (50 minutes), the reaction mixture contained 2-(phenylbromium) - 4,5 - dicyano-2H-imidazole. When this halonium compound was heated, it rearranged to 1-phenyl-2-bromo-4,5-dicyanoimidazole.

EXAMPLE 9

1 - (phenyldifluoromethyl) - 2 - fluoro - 4,5 - dicyanoimidazole (Formula I, R=—$CF_2C_6H_5$, X=F) and 2-(trifluoromethylphenyl) - 4,5 - dicyanoimidazole (Formula II, $R^1$=—$C_6H_4CF_3$)

2-diazo-4,5-dicyano-2H-imidazole (5.7 g.) was added to 250 ml. of benzotrifluoride and heated at 94° C. for 1.75 hours. During the reaction, 980 ml. of nitrogen was evolved. The hot solution was filtered, cooled in ice, and again filtered to separate crystallized product (2.13 g.) which was identified as a mixture of the meta and para isomers of 2-(trifluoromethylphenyl)-4,5-dicyanoimidazole. The $^{19}F$ NMR in $CD_3COCD_3$ has two trifluoromethyl peaks, at −3518 and −3531 Hz. from fluorotrichloromehane.

The filtrate from above was evaporated to dryness and the residue was extracted with petroleum ether. The extract was concentrated to dryness and the residue, 2.87 g. of crude 1-(phenyldifluoromethyl)-2-fluoro-4,5-dicyanoimidazole, was sublimed at 90° C./0.1 mm. The sublimate melted at 44–44.5° C.

*Analysis.*—Calcd. for $C_{12}H_5F_3N_4$ (percent): C, 55.0; H, 1.9; F, 21.7; N, 21.4. Found (percent): C, 55.2; H, 1.96; F, 21.4; N, 21.1.

IR (KBr): 4.45, 6.3, 6.97, 7.1, 8.1, 9.4, 10.3, 10.8, 13.0, 14.2μ.

NMR ($^{19}F$, $FCCl_3$): doublet J.=17, −4143 Hz.; triplet J.=17, −5330 Hz.

EXAMPLE 10

1 - [2H - 5 - (trifluoromethyl)perfluoro - 3,6 - dioxa - 2-nonyl]-2-fluoro-4,5-dicyanoimidazole (Formula I,

R=—$CH(CF_3)OCF_2CF(CF_3)OC_3F_7$,

X=F) and 2-[5-(trifluoromethyl-perfluoro-3,6,-dioxa-2-nonyl]-4,5-dicyanoimidazole [Formula II, $R^1$=—$CF(CF_3)OCF_2CF(CF_3)OF_3F_7$]

2-diazo-4,5-dicyano-2H-imidazole (5.6 g.) was stirred in 100 ml. of 2H-5-(trifluoromethyl)perfluoro-3,6-dioxanonane and heated to 89–90° C. overnight. Approximately the theoretical yield of gas was evolved. The solution was filtered hot to remove 0.60 g. of solid that did not contain any fluorine. The filtrate was distilled to leave 18.1 g. of wine-colored gum. Extractions of the gum with hexane removed a light yellow oil shown by IR proton and $^{19}F$ NMR to contain 1-[2H-5-(trifluoromethyl)perfluoro-3,6-dioxa-2-nonyl]-2-fluoro-4,5 - dicyanoimidazole. Evidence for 2-[5-(trifluoromethyl)perfluoro-3,6-dioxa-2-nonyl]-4,5-dicyanoimidazole in the residue was found by spectral analysis.

EXAMPLE 11

2-cyclohexyl-4,5-dicyanoimidazole (Formula II, $R^1$=—$C_6H_{11}$)

A suspension of 2.0 g. of 2-diazo-4,5-dicyano-2H-imidazole in 200 ml. of cyclohexane was heated under reflux for 4.5 hours. Nitrogen (250 ml.) evolved. The reaction mixture was cooled, and the solid product was collected (2.8 g.) and recrystallized from n-butyl chloride to give 1.65 g. of 2-cyclohexyl-4,5-dicyanoimidazole, M.P. 149–150° C. The infrared spectrum of this product was identical to that of 2-cyclohexyl-4,5-dicyanoimidazole prepared from cyclohexanecarboxaldehyde and diamonomaleonitrile.

EXAMPLE 12

2-phenyl-4,5-dicyanoimidazole (Formula II, $R^1$=—$C_6H_5$)

A suspension of 2.8 g. of 2-diazo-4,5-dicyano-2H-imidazole in 100 ml. of benzene was heated under reflux for 2 hours. Nitrogen (525 ml.) evolved. On cooling there was deposited 3.18 g. of 2-phenyl-4,5-dicyanoimidazole. Its identity was confirmed by comparison of its infrared spectrum with authentic material (L. E. Hinkel, G. A. Richards, and O. Thoms, J. Chem. Soc., 1432 (1937)).

EXAMPLE 13

2-(naphthyl)-4,5-dicyanoimidazole (Formula II, $R^1$=—$C_{10}H_7$)

A mixture of 2.0 g. of 2-diazo-4,5-dicyano-2H-imidazole and 25 g. of naphthalene was heated at 80–93° C. for 4 hours. Nitrogen (410 ml.) was given off. The reaction mixture was dissolved in 200 ml. of $CH_2Cl_2$ and extracted with 100 ml. of saturated $NaHCO_3$ in water. The water layer was acidified to pH 3, and 1.61 of 2-(naphthyl)-4,5-dicyanoimidazole was collected on a filter and dried. Analytical sample was recrystallized from 1,2-dichloroethane, M.P. 206–208° C.

*Analysis.*—Calcd. for $C_{15}H_8N_4$ (percent): C, 73.8; H, 3.3; N, 22.9. Found (percent): C, 73.0; H, 3.3; N, 23.7.

IR (KBr): 3–3.5 (broad), 4.45, 6.34, 6.45, 6.6, 7.25, 7.5, 7.75, 8.75, 9.70, 10.65, 11.6, 12.4, 12.9μ.

EXAMPLE 14

2-(2,5-dimethylphenyl)-4,5-dicyanoimidazole

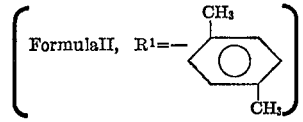

2-diazo-4,5-dicyano-2,4-imidazole (5.3 g.) was added to 50 ml. of p-xylene and heated to 80° C. After approximately 4 hours, the theoretical amount of gas had been evolved and the mixture was filtered hot to remove 4.4 g. of black solid (a). The filtrate was cooled and diluted with petroleum ether to give an additional 3.85 g. of precipitate (b). The final filtrate was distilled and the residue (c) combined with (b). The combined (b) and (c) solids were stirred with 300 ml. of methylene chloride and 200 ml. of 5% sodium carbonate solution. Insoluble solid (d) was separated by filtration, and the methylene chloride of the filtrate was separated and evaporated. The aqueous layer was acidified to pH 3 and material (e) which precipitated was filtered. The initial precipitate (a) was also processed in the above manner. The four refined products two from methylene chloride solutions and two from acidified basic solutions) were identical and total 5.42 g. They were combined and recrystallized from 1-chlorobutane to give 2-(2,5-dimethylphenyl)-4,5-dicyanoimidazole, M.P. 159–161° C.

*Analysis.*—Calcd. for $C_{13}H_{10}N_4$ (percent): C, 70.2; H, 4.55; N, 25.2. Found (percent): C, 69.8; H, 4.62; N, 25.0; 69.8; 4.69; 25.2.

In another preparation, conducted as above, the total product soluble in hot xylene was collected. The NMR

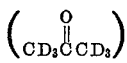

showed the persence of 2-(2,5-dimethylphenyl)-4,5-dicyanoimidazole, δ 7.41, 7.22, 2.48, 2.33 (90%), and 2-(4-methylphenylmethylene)-4,5-dicyanoimidazole, δ 7.20, 7.12, 4.13, 2.30 (10%).

EXAMPLE 15

2-bromo-4,5-dicyanoimidazole (Formula II, $R^1=Br$)

A solution of 26.6 g. of 2-amino-4,5-dicyano-2H-imidazole in 500 ml. of water and 400 ml. of 6 N HCl was treated with 20.0 g. of $NaNO_2$ in 500 ml. of water over 10 minutes at room temperature. The 2-diazo-4,5-dicyano-2H-imidazole which precipitated was collected on a filter and washed with water. The solid was suspended in a solution containing 80 ml. of 45% HBr and 750 ml. of water. Cuprous bromide (28.7 g.) was added portionwise over 3 hours as nitrogen evolved. HBr (400 ml., 45%) was added, and the reaction mixture was extracted with 5 liters of ethyl acetate. The ethyl acetate was removed under reduced pressure, and the solid which remained was washed with water. On standing overnight, the water wash deposited 8.13 g. of 2-bromo-4,5-dicyanoimidazole. Another 6.45 g. was recovered from the water-washed solid by extraction with ethyl acetate. An analytical sample was recrystallized from n-butyl chloride, M.P. 148–149° C.

*Analysis.*—Calcd. for $C_5HN_4Br$ (percent): C, 30.5; H, 0.5; N, 28.4; Br, 40.6. Found (percent): C, 30.2; H, 0.4; N, 27.7; Br, 38.8.

When the above experiment is conducted with cuprous chloride and HCl, 2-chloro-4,5-dicyanoimidazole is produced. The reaction described in this example is found to proceed much more readily when the hydrohalogen acid is present. It is presumed that a compound corresponding to Formula III is formed which in the presence of the acid is converted to the 2-halo-4,5-dicyanoimidazole that is isolated.

EXAMPLE 16

Tetraethylammonium salt of 2,4,5-tricyanoimidazole [Formula III, A=—CN, $M=N(C_2H_5)_4$]

2-diazo-4,5-dicyano-2H-imidazole (2.8 g., 19 4 mmoles) was added to a solution of 2.6 g. (40 mmoles) of potassium cyanide and 1.8 g. (20 mmoles) of cuprous cyanide in 150 ml. of water. Nitrogen was evolved, and after 2 hours at room temperature, 10 g. (60.5 mmoles) of tetraethylammonium chloride was added. The mixture was filtered and the filtrate extracted with methylene chloride. The extract was dried and concentrated to dryness to give 1.2 g. of the tetraethylammonium salt of 2,4,5-tricyanoimidazole. An analytical sample was recrystallized from n-chlorobutane, M.P. 99° C.

*Analysis.*—Calcd. for $C_{14}H_{20}N_6$ (percent): C, 61.7; H, 7.4; N, 30.9. Found (percent): C, 62.0; N, 7.2; N, 31.1.
IR (KBr): 3.32, 4.48, 6.7, 7.2, 8.5, 8.75, 10.0, and 12.24μ.

In this example, prior to the addition of tetraethylammonium chloride, the reaction mixture is believed to have contained some of each of the potassium and cuprous salts of 2,4,5-tricyanoimidazole (Formula III, A=—CN, M=K and Cu).

EXAMPLE 17

Tetraethylammonium salt of 2-nitro-4,5-dicyanoimidazole [Formula III, A=—$NO_2$, $M=N(C_2H_5)_4$]

To a mixture of 2.8 g. (19.4 mmoles) of 2-diazo-4,5-dicyano-2H-imidazole, 1.38 g. of $NaNO_2$ (20 mmoles) and 100 ml. of water was added to 100 ml. of acetonitrile. After 2 hours, 450 ml. (ca. 19 mmoles) of nitrogen had evolved. The mixture was treated with 10 g. (60.5 mmoles) of tetraethylammonium chloride, was concentrated to 100 ml., and was extracted with ethyl acetate. On concentration of the extract to dryness, there remained 1.3 g. of the tetraethylammonium salt of 2-nitro-4,5-dicyanoimidazole. An analytical sample was recrystallized from chloroform-carbon tetrachloride, M.P. 129–130° C.

*Analysis.*—Calcd. for $C_{13}H_{20}N_6O_2$ (percent): C, 53.4; H, 6.9; N, 28.8. Found (percent): C, 53.3; H, 6.6; N, 28.9.

IR (KBr): 3.35, 4.48, 6.54, 6.72, 6.95, 7.12, 7.22, 7.72, 7.92, 8.52, 8.77, 10.0, 11.9, 12.75μ.

In this example, prior to the addition of tetraethylammonium chloride, the reaction mixture is believed to have contained the sodium salt of 2-nitro-4,5-dicyanoimidazole (Formula III, A=—$NO_2$, M=Na).

When the above experiment is conducted with sodium iodide in place of sodium nitriate, the sodium salt of 2-iodo-4,5-dicyanoimidazole is produced.

EXAMPLE 18

Sodium and potassium salts of 2-azido-4,5-dicyanoimidazole (Formula III, A=—N=N=N, M=Na and K)

A solution of 3.0 g. (21 mmoles) of 2-diazo-4,5-dicyano-2H-imidazole in 100 ml. of acetonitrile was added to a solution of 1.2 g. (18.5 mmoles) of sodium azide in 20 ml. of water over a period of 10 minutes. The mixture was stirred for 1 hour while gas evolved and was then concentrated to dryness under reduced pressure. The residue was extracted with 300 ml. of acetonitrile, and the extract evaporated to give 2.4 g. of the sodium salt of 2-azido-4,5-dicyanoimidazole; IR 2230 cm.$^{-1}$ (—CN), 2150 (—N=N=N). For elemental analysis, a sample was converted to its potassium derivative by recrystallization three times from water saturated with potassium chloride. The dry product was taken up in ethyl acetate and was filtered to remove traces of KCl. The solvent was then removed under reduced pressure, M.P. >350° C.

*Analysis.*—Calcd. for $KC_5N_7 \cdot H_2O$ (percent): C, 27.9; N, 45.6. Found (percent): C, 28.1; N, 46.0.

EXAMPLE 19

2-(phenyliodonium)-4,5-dicyano-2H-imidazole

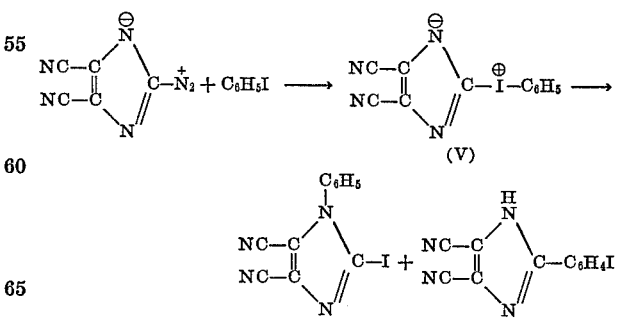

2-diazo-4,5-dicyano-2H-imidazole (5.5 g., 0.038 mole) was heated at 80° C. in 70 ml. of iodobenzene. After 6 hours, approximately the theoretical yield of gas (910 ml.) was evolved. After refluxing overnight, the solution was filtered hot to give 10.9 g. of a yellow powder that was recrystallized from acetonitrile. This product, M.P. 221–222° C., was characterized as the iodonium salt (V) by IR, NMR, elemental analysis and mass spectra.

*Analysis.*—Calcd. for $C_{11}H_5N_4I$ (percent): C, 41.3; H, 1.57; N, 17.5; I, 39.7. Found (percent): C, 41.5, 4.13; H, 1.79, 1.72; N, 17.2; I, 39.5.

The filtrate was evaporated to give 1.4 g. of crystallization solid, M.P. about 55° C., that appeared by IR and NMR to be a mixture of 1-phenyl-2-iodo-4,5-dicyanoimidazole and 2-(iodophenyl)-4,5-dicyanoimidazole.

The novel 1-hydrocarbon-substituted 2-halo - 4,5 - dicyanoimidazoles are generally useful as agents for removing halogen acids, e.g., hydrogen chloride, from organic solutions were distillation or neutralization procedures are not desirable. They can be used to analyze for halogen acids in organic solvents, by adding an excess of the imidazole to a sample of the solution followed by filtering, collecting, drying and weighing the insoluble imidazole derivative which remains on the filter. They can also be used as buffers in organic aprotic solvents to maintain a constant proton level.

EXAMPLE A

Removal of hydrogen chloride from an HCl-containing solvent

A solution of 50 mg. of 1-ethyl-2-iodo-4,5-dicyanoimidazole in 10 ml. of ether was added to 10 ml. of ether saturated with HCl at 25° C. A precipitate of 1-ethyl-2-iodo-4,5-dicyanoimidazole hydrochloride formed immediately. The hydrochloride was collected on a filter and was dried under a stream of nitrogen. The hydrogen chloride dissociated and vaporized in the nitrogen stream. The imidazole which remained (50 mg.) was again soluble in ether, and its infrared spectrum confirmed that it was the starting material 1-ethyl-2-iodo-4,5-dicyanoimidazole.

The production of cyanogen and hydrogen chloride by reaction of chlorine and hydrogen cyanide in an organic solvent (cf., coassigned Webster CR 6999 application; Ser. No. 20,820; filed Mar. 18, 1970; allowed July 9, 1971) is another example of a process where removal of hydrogen chloride from solution by distillation would be difficult. If the cyanogen in the organic solvent is to be used in a reaction requiring base catalysis, e.g., the reaction of cyanogen and hydrogen cyanide to produce diiminosuccinonitrile as in U.S. Pat. 3,564,039, neutralization of the hydrogen chloride by adding additional base can be advantageously avoided by using a 1-hydrocarbon-substituted 2-halo-4,5-dicyanoimidazole as the hydrogen chloride acceptor, as in Example A. The advantage lies in the economical use of the base catalyst, the ability to recover and recycle the imidazole, and the ability to recover the vaporized hydrogen chloride, if desired.

The embodiments of the invention in which an exclusive property or privilege is claimed are defined as follows:

1. A compound having the formula

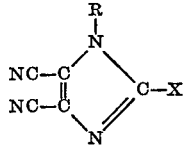

wherein

R is alkyl, alkaryl, aralkyl, fluoro(oxaalkyl), haloalkyl or aryl(haloalkyl) each of up to 8 carbon atoms or is phenyl or naphthyl; and X is fluorine, chlorine, bromine or iodine; with the proviso that when X is iodine, R is only alkyl, aralkyl, fluoro(oxaalkyl) or haloalkyl, "halo" being F, Cl or Br.

2. The compound of claim 1 wherein $R=CH_2CH_2Cl$ and $X=Cl$; 1-(2-chloroethyl)-2-chloro-4,5-dicyanoimidazole.

3. The compound of claim 1 wherein $R=CHBr_2$ and $X=Br$; 1 - dibromomethyl-2-bromo-4,5-dicyanoimidazole.

4. The compound of claim 1 wherein $R=CFClCFCl_2$ and $X=Cl$; 2-chloro-1-(1,2-difluoro-1,2,2-trichloroethyl)-4,5-dicyanoimidazole.

5. The compound of claim 1 wherein $R=C_2H_5$ and $X=I$; 2-iodo-1-ethyl-4,5-dicyanoimidazole.

6. The compound of claim 1 wherein $R=C_6H_5$ and $X=Cl$; 1-phenyl-2-chloro-4,5-dicyanoimidazole.

7. A process of reacting, at a temperature range of 50°–140° C., 2-diazo-4,5-dicyano-2H-imidazole with RX wherein R is alkyl, alkaryl, aralkyl, fluoro(oxaalkyl), haloalkyl or aryl(haloalkyl) each of up to 8 carbon atoms or is phenyl or naphthyl; and X is fluorine, chlorine, bromine or iodine; with the proviso that when X is iodine, R is only alkyl, aralkyl, fluoro(oxaalkyl) or haloalkyl.

8. A process according to claim 7 wherein the temperature range is 80°–100° C.

References Cited

UNITED STATES PATENTS 2,534,331   12/1950   Woodward _____ 260—309
3,435,050   3/1969    Wasco _____ 260—309
3,709,900   1/1973    Hartter _____ 260—309

OTHER REFERENCES

Beaman et al.: Chem. Abst., vol. 65, column 13687 (1966).

Ganushchak et al.: Chem. Abst., vol. 60, columns 14410-1 (1946).

Grimmett In: Katritzky et al., Advances in Heterocyclic Chemistry, vol. 12, pp. 170-1 relied on (1970).

Naiden et al.: Chem. Abst., vol. 65, column 13580 (1966).

Pastushak et al.: Chem. Abst., vol. 61, column 10623 (1964).

Bredereck et al.: Liebigs Annal. Chem., vol. 600, pp. 95-108 (1956).

NATALIE TROUSOF, Primary Examiner

U.S. Cl. X.R.

252—189, 408; 260—141, 349